United States Patent
He et al.

(10) Patent No.: US 7,472,294 B2
(45) Date of Patent: Dec. 30, 2008

(54) PRE-EMPTIVE POWER SUPPLY CONTROL SYSTEM AND METHOD

(75) Inventors: Runsheng He, Sunnyvale, CA (US); Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 469 days.

(21) Appl. No.: 11/403,517

(22) Filed: Apr. 13, 2006

(65) Prior Publication Data

US 2006/0184816 A1    Aug. 17, 2006

Related U.S. Application Data

(62) Division of application No. 10/426,745, filed on Apr. 30, 2003.

(51) Int. Cl.
*G06F 1/26* (2006.01)
(52) U.S. Cl. ........................ 713/310; 713/300
(58) Field of Classification Search ......... 713/300–320, 713/340
See application file for complete search history.

(56) References Cited

U.S. PATENT DOCUMENTS

| | | | |
|---|---|---|---|
| 4,829,199 A | 5/1989 | Prater | |
| 4,980,836 A | 12/1990 | Carter et al. | |
| 5,260,644 A | 11/1993 | Curtis | |
| 5,987,615 A | 11/1999 | Danstrom | |
| 6,252,375 B1 | 6/2001 | Richter et al. | |
| 6,304,978 B1 | 10/2001 | Horigan et al. | |
| 6,308,240 B1 | 10/2001 | De Nicolo | |
| 6,396,725 B1 | 5/2002 | Jacobs et al. | |
| 6,397,321 B1 | 5/2002 | Yamamoto et al. | |
| 6,978,388 B1 * | 12/2005 | Cornelius | 713/320 |
| 2002/0133729 A1 | 9/2002 | Therien et al. | |
| 2003/0107356 A1 | 6/2003 | Hachiya | |

FOREIGN PATENT DOCUMENTS

| | | |
|---|---|---|
| EP | 1473607 A1 | 3/2004 |
| WO | WO 02/31951 A2 | 4/2002 |
| WO | WO 02/077742 A1 | 10/2002 |

OTHER PUBLICATIONS

Official Communication from the European Patent Office dated Sep. 4, 2006 for Application No. 04 007 362.9-2206; 15 pages.
Communication pursuant to Article 96(2) EPC for European Application No. 04007362.9, entitled, "Pre-Emptive Power Supply Control System and Method".
DS87C550 EPROM High-Speed Micro with ADC and PWM, Dallas Semiconductor Datasheet, Downloaded from website Sep. 30, 2002, Number on first page might indicate Jun. 14, 1999.

* cited by examiner

*Primary Examiner*—Dennis M Butler

(57) ABSTRACT

A device comprising an integrated circuit including at least one circuit block having an operating mode controlled in response to an enable signal or a clock signal. The circuit block receives a load current to power the circuit block, an amplitude of the load current being a function of the operating mode of the circuit block. The integrated circuit includes a weighting circuit to generate a weighting signal to indicate an expected amplitude of the load current of the integrated circuit. The weighting circuit monitors at least one of the enable signal and the clock signal and determines the expected amplitude of the load current as a function of the at least one of the enable signal and the clock signal.

21 Claims, 3 Drawing Sheets

PRE-EMPTIVE POWER SUPPLY CONTROL SYSTEM AND METHOD

CROSS-REFERENCE TO RELATED APPLICATIONS

This application is a divisional of U.S. patent application Ser. No. 10/426,745 filed on Apr. 30, 2003. The disclosure of the above application is incorporated herein by reference in its entirety.

TECHNICAL FIELD

An aspect of this invention relates to communication systems for power supplies.

BACKGROUND

A power supply is typically used to convert unregulated power from an input source to regulated power that is usable by electronic equipment associated with the power supply. In some types of electronic equipment such as portable computers, reduced power consumption is of vital importance. To reduce power consumption, a power management scheme may be employed to disable and enable selected assemblies of the equipment during predetermined operating modes. When the selected equipment assemblies are enabled or disabled, the load presented by the electronic equipment may change causing voltage transients in the regulated power. During the transient loading condition, the operation of the power supply typically deviates from optimal operation such as decreased power efficiency, increased output voltage regulation error, and potential transient overcurrents. The power supply volume required for output filtering is typically related to the magnitude of transient output overcurrents so that for greater transient currents, increased volume is required for output capacitors. In addition, transients in the regulated power may adversely affect the operation of the electronic equipment, decreasing reliability and potentially causing data errors and automatic reset of the equipment.

SUMMARY

A control system for controlling a power supply having an operating function. The power supply to supply output current to an integrated circuit having at least one circuit block that is controllable by an enable signal or a clock signal. A receiver to receive the enable signal or the clock signal. A controller to determine a loading status of the at least one circuit block as a function of the enable signal or the clock signal and to control the output current of the power supply as a function of the loading status of the at least one circuit block such that the power supply preemptively changes the output current.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
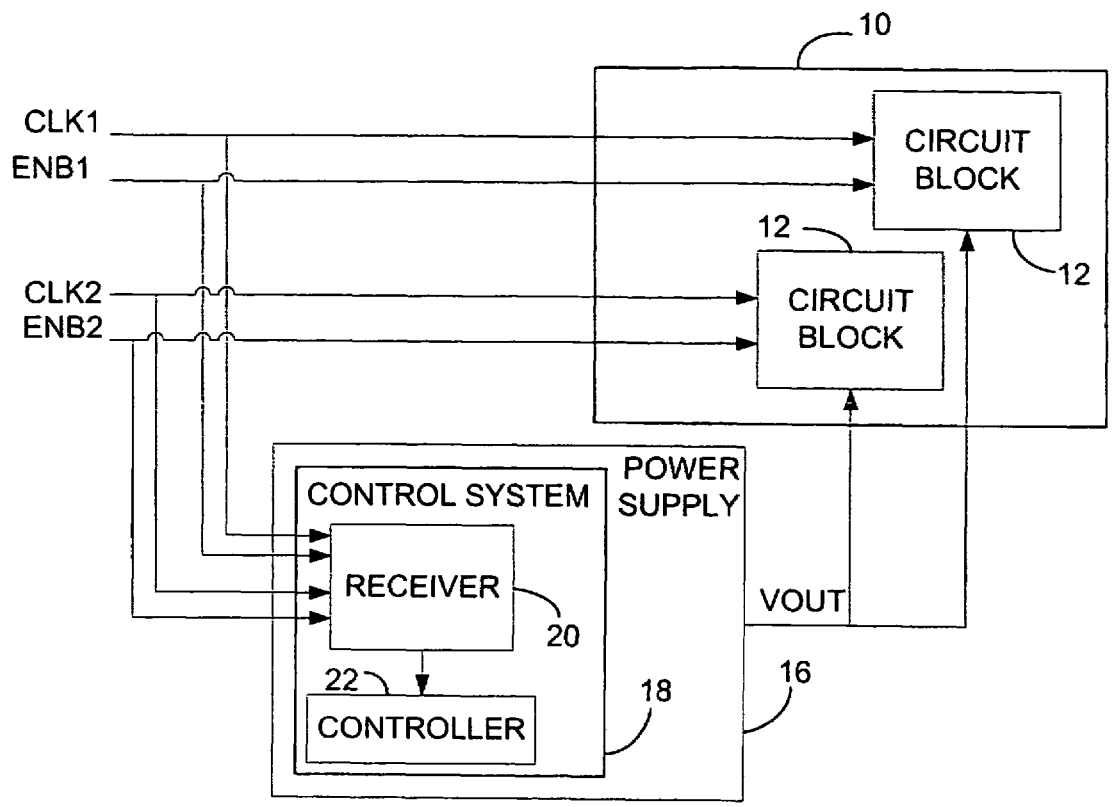
FIG. 1 shows a block diagram of an aspect of a control system.

FIG. 1 shows an integrated circuit 10 for processing information and a power supply 16 for supplying power to the integrated circuit 10. The integrated circuit 10 may include a power management scheme to control the operation of one or more circuit blocks 12 of the integrated circuit 10. Advantageously, operating functions of the power supply 16 may be controlled on the basis of which of the circuit blocks 12 of the integrated circuit 10 are enabled or disabled.

In one exemplary power management scheme for the integrated circuit 10, clock signals, CLK, and enable signals, ENB, associated with each of the circuit blocks 12 may control operations of the circuit blocks 12. Each of the circuit blocks 12 may be individually controlled by the clock and enable signals. For example, the enable signal, ENB, may control one of the circuit blocks 12 independent of the clock signal, CLK. Also, the clock signal, CLK, may control one the circuit blocks 12 independent of the enable signal, ENB. In another aspect, an enable signal may control the clock signal for one of the circuit blocks 12. Disabling one of the circuit blocks 12 via the enable or clock signals may cause an interruption of information processing within the circuit block 12, resulting in a reduction in the power consumption. The load presented by each of the circuit blocks 12 may be a function of the enable and clock signals. When a circuit block 12 is enabled, the loading of the circuit block 12 may be greater than when the circuit block is disabled. Similarly, when a circuit block 12 receives an active clock signal, the loading of the circuit block 12 may be greater than when the circuit block 12 receives an inactive clock signal or when the frequency of the clock signal is lower. While the circuit blocks 12 are shown and described as being portions of a single integrated circuit, the particular grouping is merely exemplary. For example, each of the circuit blocks 12 may be included in separate integrated circuits.

In another aspect, clock control circuits may be included within the circuit blocks 12 to control the operation of the corresponding clock signals. The clock control circuits may each receive a clock signal and a clock enable signal. The clock signal may be controlled as a function of the clock enable signal.

A power supply 16 may generate one or more regulated outputs to power the circuit blocks 12. The power supply 12 may be any type of regulator such as linear regulators and switching regulators. The power supply 16 may include numerous operating functions such as operating frequency, operating mode, current limit thresholds, the quantity of parallel power switches that conduct energy between the input power source and the output, and control circuitry. The control circuitry may include the modules and components that shape the response of the power supply to steady-state and transient operating conditions. The control circuitry may be implemented in digital circuitry, analog circuitry, or mixed-signal circuitry.

The power supply 16 may include a control system 18 to control the operating functions of the power supply as a function of the circuit blocks 12 that are enabled. While the control system 18 is shown and described as being included in the power supply 16, the described implementation of the control system 18 is merely exemplary, and the entire control system 18 as well as portions of the control system 18 may be located external to the power supply.

The control system 18 may include a receiver 20 to receive the clock and enable signals. The receiver 20 may be any type of receiver such as buffers, amplifiers, passive, and active circuits, and extending to a mere conductive path. The receiver 20 may receive any type of clock control signal that is indicative of the current loading status of the circuit blocks 12 such as clock signals and enable signals. The clock control signal may control operations such as read operations and write operations of the circuit block 12. The current loading status of the circuit block 12 may be determined based on the clock control signal such as read operations at a predetermined rate of one circuit block 12 may correspond to a predetermined current loading of the circuit block 12. A controller 22 may be in communication with the receiver 20 to receive the loading information. The controller 22 may control some or all of the operating functions of the power supply 16 in response to the loading information. For example, in response to detecting that the clock for one of the circuit blocks 12 is being enabled, the controller 22 may change the operating mode of the power supply 16 to a hysteretic mode to speed up the transient response of Vout.

Figure 2:
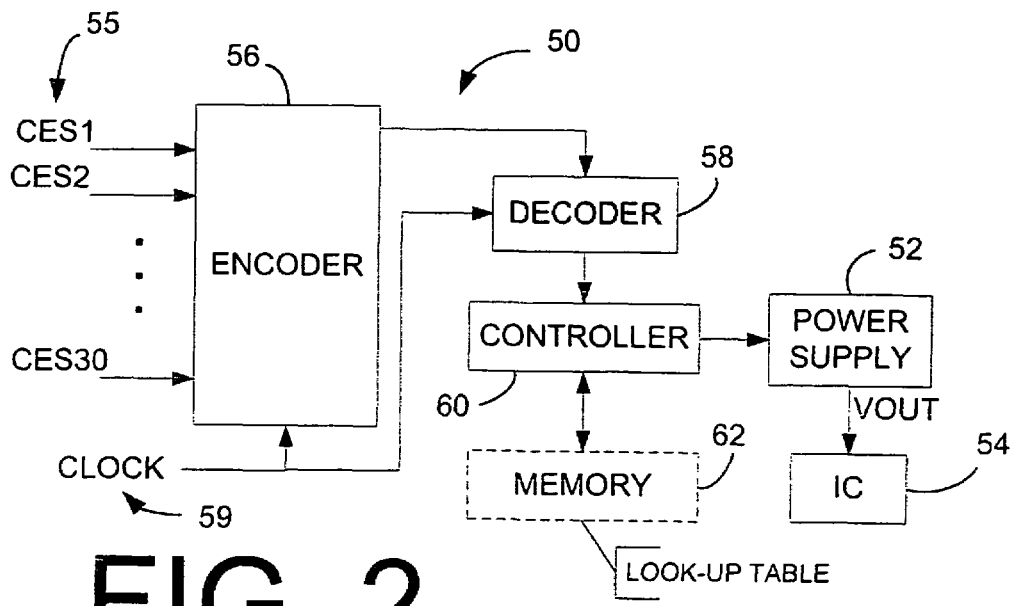
FIG. 2 shows a block diagram of another aspect of a control system.

FIG. 2 shows an aspect of a control system 50 to control the operating functions of a power supply 52 as a function of the loading presented by an integrated circuit 54. The loading of the integrated circuit 54 may vary based on portions of the integrated circuit 54 that receive clock signals that are controlled by clock enable signals, CES, 55. There may be any quantity of clock enable signals 55 controlling different portions of the integrated circuit 54.

The control system 50 may include an encoder 56 to combine clock information related to multiple clock enable signals 55 into an encoded signal. The encoded clock signal may include clock information such as the enable status of each clock enable signal and the approximate power load corresponding to each clock enable signal. Any type of encoder 56 may be employed for encoding the clock enable signals 55 into a combined signal.

A decoder 58 may decode the encoded signal to extract the clock information related to the clock enable signals 55. Any type of decoder may be employed to decode the encoded signal. A clock signal 59 may be communicated to the encoder 56 and decoder 58 for encoding and decoding the clock information related to the clock enable signal signals 55. The decoder 58 may communicate the clock information to a controller 60.

A controller 60 may receive the clock information from the decoder 58 and control the operating functions of the power supply 52 on the basis of the clock information. The controller 60 may also access a memory 62 containing loading information related to the integrated circuit 54. The memory 62 may be structured so that the loading information is accessed as a function of the clock enable signals 55. The loading information may include information such as the approximate power load corresponding to each clock enable signal and the load profile corresponding to each clock enable signal. For example, if the decoded clock information indicates that CES2 is enabled, the controller 60 may access the memory 62 to determine the approximate power load corresponding to CES2.

While the control system 50 is shown and described as being separated into multiple assemblies, the particular division of functions is merely exemplary, and the control system 50 could be mounted on a single assembly or multiple assemblies. In one exemplary aspect, the encoder 56 may be included in the integrated circuit 54, and the decoder 58, controller 60, and memory 62 may be included in the power supply 52. In another exemplary aspect, the encoder 56 is included in the integrated circuit 54, and the controller 60 is included in the power supply 52, while the decoder 58 is a separate assembly.

Figure 3:
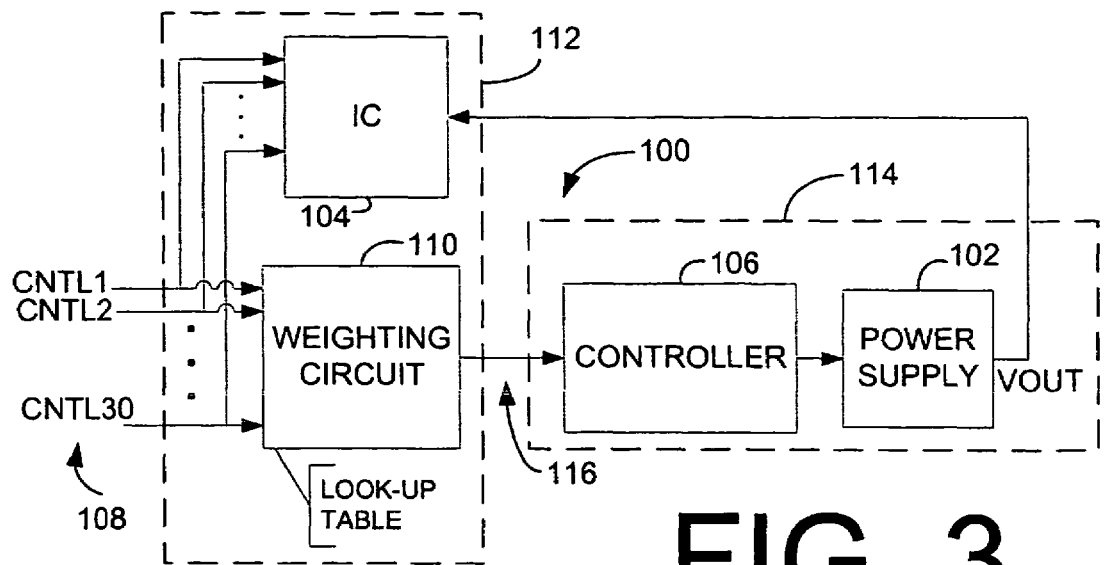
FIG. 3 shows a block diagram of a third aspect of a control system.

FIG. 3 shows an aspect of a control system 100 to control the operating functions of a power supply 102 as a function of the loading presented by an integrated circuit, IC, 104. The IC 104 may receive several control signals, CNTL, 108 such as enable signals, clock enable signals, and clock signals that may affect the power loading of portions of the IC 104 by controlling the operation of those portions of the IC 104. The control signals 108 may also be communicated to a weighting circuit 110 so that the weighting circuit 110 may combine the control signals 108 into a combined signal. The weighting circuit 110 may apply weighting to groups of the control signals 108 such as indicating whether more than half of the total quantity of control signals in a group are enabled or active. In such a case, the combined signal may request a change to the operating functions of the power supply 102. The weighting circuit 110 may also apply weighting to each control signal on the basis of the predicted loading change associated with the portions of the IC 104 corresponding to each of the control signals 108. Loading information for applying the weighting may be stored in any device such as a look-up table and a database. The weighting circuit may be implemented in any device or combination of devices such as processors, summers, and lookup tables. The weighting circuit 110 may also encode the combined signal.

A controller 106 may control the operating functions of the power supply 102 as a function of the combined signal. The controller 106 may be located with the power supply 102 as well as external to the power supply 102.

In one exemplary aspect, the weighting circuit 110 may be formed as a portion of the IC 104 to form a single integrated circuit (IC) 112 and the controller 106 may be combined with the power supply 102 into a combined power supply 114. By forming the weighting circuit 110 on the same IC 112 as the circuitry of the IC 104, an interface 116 to the power supply 114 is reduced. The weighting circuit 110 may combine multiple clock and enable signals into a weighted signal that may be communicated to the combined power supply through the interface 116. The weighted signal may be a digital signal having a bitlength of two or more bits to indicate the expected change in load current from the IC 112. The greater the bitlength, the greater the resolution of the weighting signal.

Figure 4:
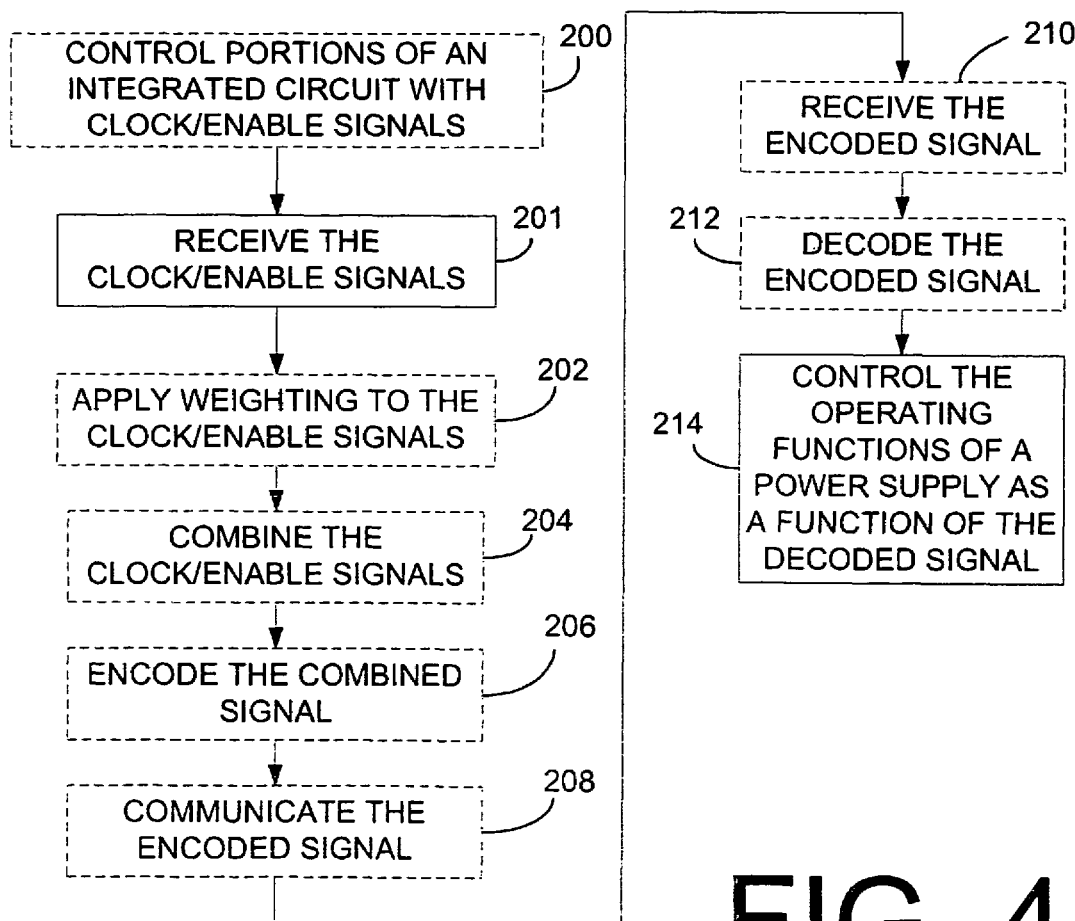
FIG. 4 shows a flow diagram of an aspect of a control system.

FIG. 4 shows an aspect of the operation of a control system for controlling the operating functions of a power supply that supplies power to an integrated circuit, IC. At step 200, the clock and/or enable signals may be communicated to an integrated circuit to control portions of the integrated circuit. At step 201, the clock and/or enable signals may be received. At step 202, weighting may be applied to the clock and/or enable signals to indicate a loading change of the portions of the integrated circuit. At step 204, the clock and/or enable signals may be combined into a combined signal. At step 206, the combined signal may be encoded. At step 208, the encoded signal may be communicated. At step 210, the encoded signal may be received. At step 212, the encoded signal may be decoded. At step 214, control the operating functions of the power supply as a function of the decoded signal.

Figure 5:
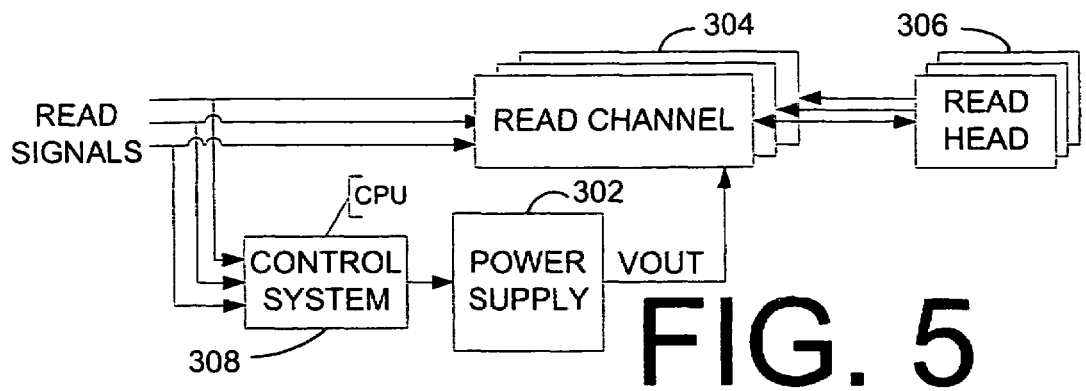
FIG. 5 shows a block diagram of an aspect of a control system.

FIG. 5 shows an aspect of a control system 308 to control the operating functions of a power supply 302 as a function of the loading presented by one or more read channels 304. The read channels 304 may receive one or more read signals, RG, for controlling read operations by the read channels 304 of one or more read heads 306. The read heads 306 may be included in a disk drive unit and read information stored in the disk drive unit. The power load presented by the read channels 304 and read heads 306 to the power supply 302 generally increases during a read operation. The power load presented by the read operations may include any range of power load such as no power, intermediate power, and full power. The control system 308 may be implemented in any type of circuit such as processors and discrete circuits. The control system 308 may determine the loading status of each read channel 304 on the basis of the read signals and generate a power supply control signal to pre-emptively control the output current of the power supply before a change occurs in the output current of the read channel 304.

The read signals may be any type of signal that controls read operations of the read channels 304 such as read enable signals and read clock signals. Any combination of read signals may control the read channels 304 such as each may control a corresponding read channel 304, and a single read enable signal may control several of the read channels 304.

Figure 6:
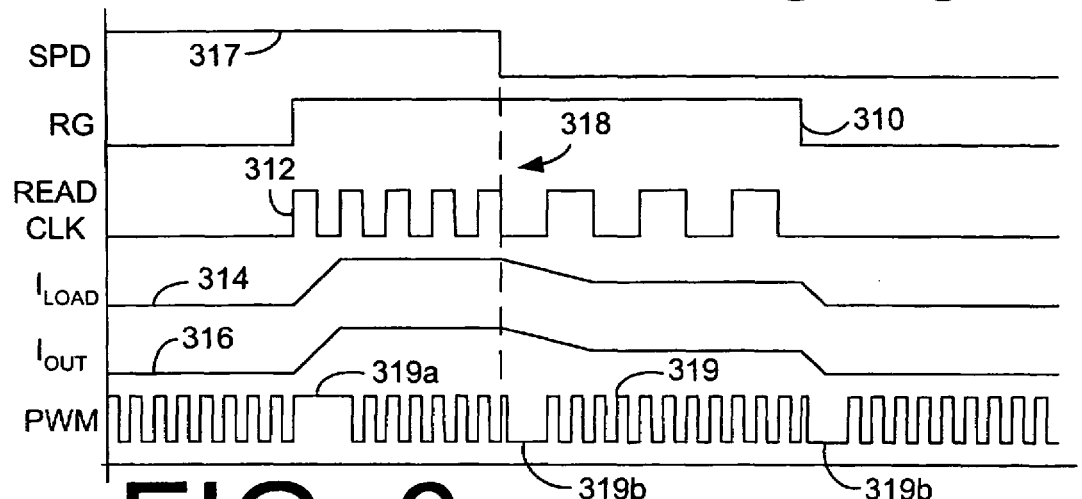
FIG. 6 shows waveforms associated with an aspect of a control system.

Referring to FIG. 6, a first waveform shows a read enable signal 310, RG, transitioning from "off" to "read" to "off". A second waveform shows a read clock signal 312, READ CLK, for controlling the read channel 304. The read enable signal may control the operation of the read clock signal such as by controlling the operating frequency of the read clock signal to control read operations of the read channel 304. A higher operating frequency of the read clock signal may cause more read operations per unit of time causing an increase in the power load presented by the read channel. The read clock signal may also control the read channel without a read enable signal. For example, a clock generator (not shown) may control the operating frequency of the read clock signal to control the read channel 304 read operations. A third waveform shows a current load 314, $I_{LOAD}$, presented by the read channel 304. The current load 314 may increase as the frequency of read operations increases. A fourth waveform shows an output current 316, $I_{OUT}$, of the power supply 302 for supplying power to the read channel 304. A fifth waveform shows a speed signal, SPD, 317 to control the speed of the read operations such as by changing the frequency of the read clock 312. A sixth waveform shows a pulse width modulation (PWM) signal 319 of an exemplary power supply. The control system 308 may extend the on-time 319a or off-time 319b of the PWM signal 319 to improve the response time of the power supply to expected load transients.

In one aspect of a read operation, the read enable signal 310 is initially low disabling the read clock signal 312. When the read enable transitions high the read clock signals 312 are enabled. The read channels 304 start a read operation when the read clock signals become active. The read clock signals are also communicated to the control system 308 which determines an estimated change in the current load of the power supply based on the read signals that are enabled and the number of read operations that will be executed per unit of time. The control system 308 may communicate the change in the current load to the power supply 302 which then changes the output current 316 to match the expected change in the load current 314 to pre-empt the occurrence of transients in the output voltage.

The read operations continue at about a constant frequency until switching instant 318 when the frequency of the read operations decreases. The control system 308 senses the change in the read clock signal 312 and signals the power supply 302 to pre-emptively change the output current 316 to anticipate the expected change in the load current 314. The change in output current 316 approximately matches the change in the load current 314 thereby reducing voltage transients and stress on filter elements such as energy storage capacitors.

Figure 7:
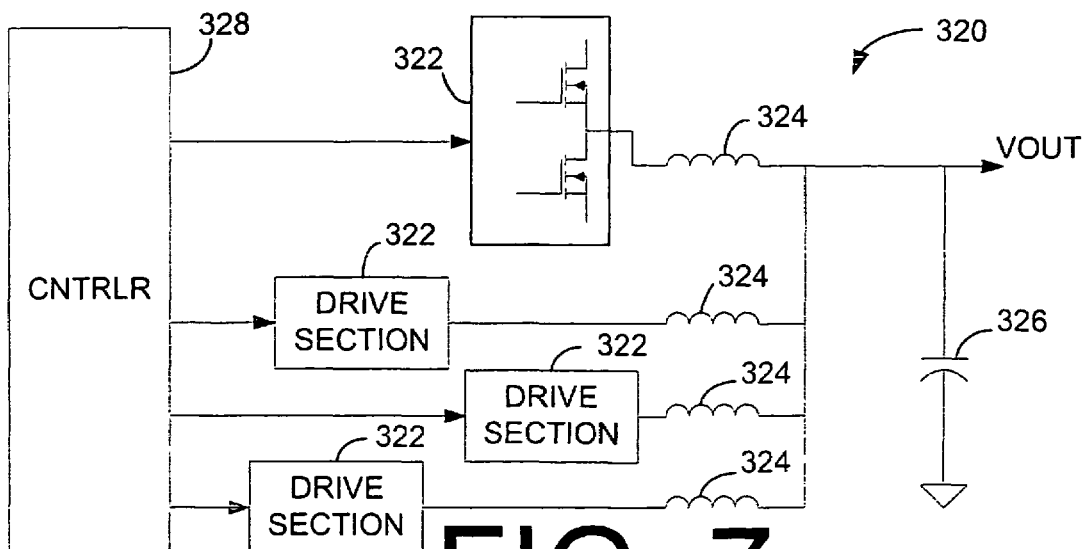
FIG. 7 shows a block diagram of an aspect of a power supply.

FIG. 7 shows an aspect of a power section 320 of the power supply 302. The power section 320 may include one or more drive sections 322 for converting an input voltage to a chopped output. Each of the drive sections 322 may connect through an inductor 324 to an output capacitor 326 for filtering the chopped output to a regulated output.

A controller, CNTRLR, 328 may control each of the drive sections 322 individually in response to enable and clock signals. The controller 328 may receive and process the enable and clock signals in accordance with the principles of the controllers and weighting circuits described in this specification. The controller 328 may, in response to the enable and clock signals, set each of the drive sections 322 to generate any proportion of the total output current required by the portions of the integrated circuit or integrated circuits. For example, equal portions of the output current may be generated by each of the drive sections 322. In another example, one drive section 322 may generate all of the output current while the remaining drive sections 322 generate no output current.

A number of embodiments of the invention have been described. Nevertheless, it will be understood that various modifications may be made without departing from the spirit and scope of the invention. Accordingly, other embodiments are within the scope of the following claims.

What is claimed is:

1. A device comprising:
    an integrated circuit including at least one circuit block having an operating mode controlled in response to an enable signal or a clock signal, the circuit block to receive a load current to power the circuit block, an amplitude of the load current being a function of the operating mode of the circuit block,
    the integrated circuit including a weighting circuit to generate a weighting signal to indicate an expected amplitude of the load current of the integrated circuit, the weighting circuit to monitor at least one of the enable signal and the clock signal and to determine the expected amplitude of the load current as a function of the at least one of the enable signal and the clock signal.

2. The device of claim 1 wherein the integrated circuit includes a plurality of circuit blocks, each of the plurality of circuit blocks controlled in response to corresponding enable signals or clock signals.

3. The device of claim 1 wherein the weighting circuit is selected from a group consisting of processors, digital circuits, and look-up tables.

4. The device of claim 1 wherein the weighting signal is a digital signal having a bitlength of at least two bits.

5. The device of claim 1 wherein the weighting circuit further comprises a memory to store clock information corresponding to the enable signal and the clock signal.

6. The device of claim 5 wherein the clock signal has a frequency and the clock information is selected from the group consisting of the frequency of the clock signal, an approximate power load of the circuit block corresponding to the clock signal or the enable signal, and an enable status of the enable signal.

7. The device of claim 1 further comprising an encoder to encode the weighted signal.

8. A method of controlling a flow of current to an integrated circuit, the integrated circuit including at least one circuit block having an operating mode, the circuit block to receive a load current to power the circuit block, comprising:
   controlling the operating mode of the at least one circuit block in response to an enable signal or a clock signal whereby an amplitude of the load current is a function of the operating mode of the circuit block;
   monitoring at least one of the enable signal and the clock signal;
   determining an expected amplitude of the load current as a function of the at least one of the enable signal or the clock signal; and
   generating a weighting signal to indicate the expected amplitude of the load current of the integrated circuit.

9. The device of claim 8 wherein the integrated circuit includes a plurality of circuit blocks;
   controlling each of the plurality of circuit blocks in response to corresponding enable signals or clock signals; and
   generating the weighting signal as a function of each of the corresponding enable signals or clock signals.

10. The device of claim 8 further comprising providing a weighting circuit to generate the weighting signal; and
    wherein the weighting circuit is selected from a group consisting of processors, digital circuits, and look-up tables.

11. The device of claim 8 wherein the weighting signal is a digital signal having a bitlength of at least two bits.

12. The device of claim 8 further comprising storing clock information corresponding to the enable signal and the clock signal.

13. The device of claim 12 wherein the clock signal has a frequency and the clock information is selected from the group consisting of the frequency of the clock signal, an approximate power load of the circuit block corresponding to the clock signal or the enable signal, and an enable status of the enable signal.

14. The device of claim 8 further comprising encoding the weighted signal.

15. A device comprising:
   an integrated circuit including at least one circuit block having an operating mode controlled in response to an enable signal or a clock signal, the circuit block to receive a load current to power the circuit block, an amplitude of the load current being a function of the operating mode of the circuit block,
   the integrated circuit including;
      means for monitoring at least one of the enable signal and the clock signal;
      means for determining an expected amplitude of the load current as a function of the at least one of the enable signal and the clock signal; and
      means for generating a weighting signal to indicate the expected amplitude of the load current of the integrated circuit.

16. The device of claim 15 wherein the integrated circuit includes a plurality of circuit blocks;
   means for controlling each of the plurality of circuit blocks in response to corresponding enable signals or clock signals; and
   means for generating the weighting signal as a function of each of the corresponding enable signals or clock signals.

17. The device of claim 15 wherein the means for generating the weighting signal is selected from a group consisting of processors, digital circuits, and look-up tables.

18. The device of claim 15 wherein the weighting signal is a digital signal having a bitlength of at least two bits.

19. The device of claim 18 further comprising means for storing clock information corresponding to the enable signal and the clock signal.

20. The device of claim 19 wherein the clock signal has a frequency and the clock information is selected from the group consisting of the frequency of the clock signal, an approximate power load of the circuit block corresponding to the clock signal or the enable signal, and an enable status of the enable signal.

21. The device of claim 15 further comprising means for encoding the weighted signal.

* * * * *

UNITED STATES PATENT AND TRADEMARK OFFICE
CERTIFICATE OF CORRECTION

PATENT NO.        : 7,472,294 B2                                          Page 1 of 1
APPLICATION NO.   : 11/403517
DATED             : December 30, 2008
INVENTOR(S)       : Runsheng He et al.

It is certified that error appears in the above-identified patent and that said Letters Patent is hereby corrected as shown below:

Column 2, Line 32        Insert -- of -- after "one"
Column 3, Line 54        Delete "signal" after "enable"

Signed and Sealed this

Third Day of March, 2009

JOHN DOLL
*Acting Director of the United States Patent and Trademark Office*